J. S. BANKS.

REINFORCED BLOCK WALL.

APPLICATION FILED JULY 8, 1913.

Reissued Jan. 13, 1914.

13,673.

2 SHEETS—SHEET 1.

Witnesses

Inventor

J. S. Banks.

By

Attorneys

J. S. BANKS.

REINFORCED BLOCK WALL.

APPLICATION FILED JULY 8, 1913.

Reissued Jan. 13, 1914.

13,673.

2 SHEETS—SHEET 2.

Witnesses

Thomas Espey

Inventor

J. S. Banks.

By

Attorney

UNITED STATES PATENT OFFICE.

JOHN SCOTT BANKS, OF PORTSMOUTH, VIRGINIA.

REINFORCED BLOCK WALL.

Specification of Reissued Letters Patent. Reissued Jan. 13, 1914.

13,673.

Original No. 1,061,441, dated May 13, 1913, Serial No. 680,644. Application for reissue filed July 8, 1913. Serial No. 777,976.

*To all whom it may concern:*

Be it known that I, JOHN SCOTT BANKS, a citizen of the United States, residing at Portsmouth, in the county of Norfolk and State of Virginia, have invented certain new and useful Improvements in Reinforced Block Walls, of which the following is a specification.

This invention relates to masonry and concrete structures and more especially to block walls which are built in parallel thicknesses and reinforced.

One object of my invention is the provision of a wall formed of superposed layers or courses of blocks spaced from each other to provide for a full circulation of air between the blocks but so constructed as to permit the blocks to be shifted toward or from each other to thereby construct a thicker or a thinner wall.

Another object of my invention is the provision of a block wall of such character that the blocks forming the outer and inner thicknesses of the wall may be adjusted toward or from each other so as to vary the thickness of the wall according to the requirements of any particular structure.

A further object of the invention is to form the blocks on which the wall is made with inwardly extending supporting and binding lugs, so formed that reinforcing bars may be disposed upon the faces of the lugs to connect the outer and inner thicknesses of the wall.

Other objects will appear in the course of the following description.

The following specification sets forth one embodiment of my invention and the manner in which it may be carried out, all as fully shown in the accompanying drawings wherein:—

Figure 1:
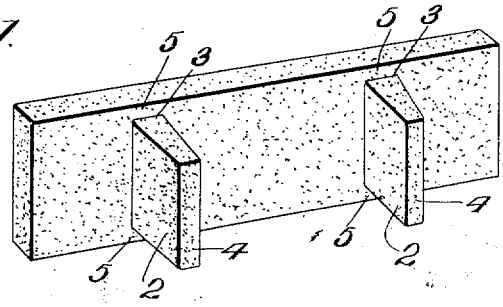
Figure 2:
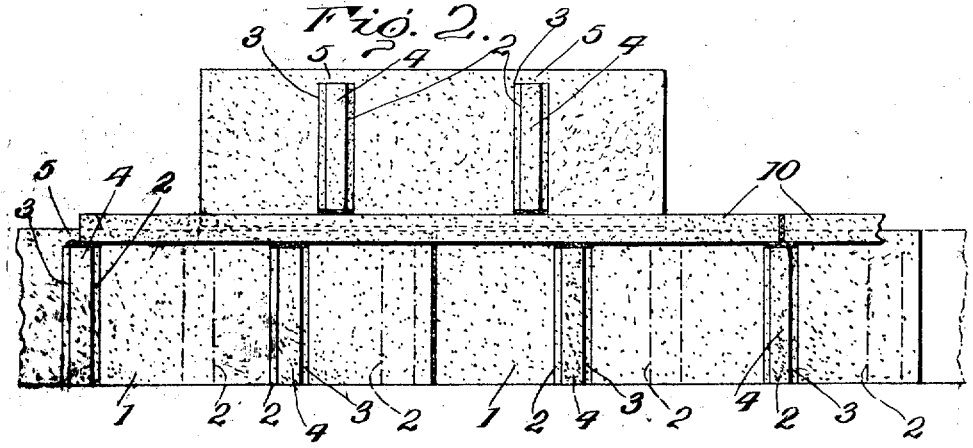
Figure 3:
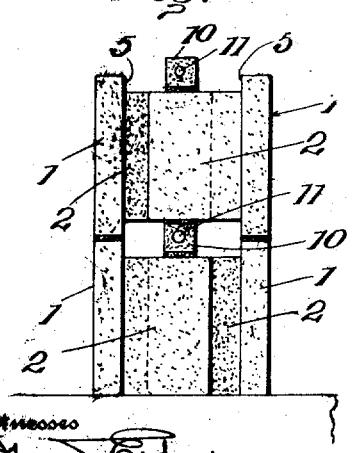
Figure 5:
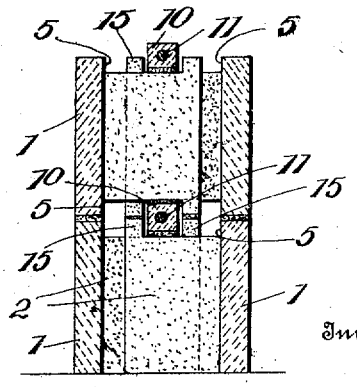
Figure 4:
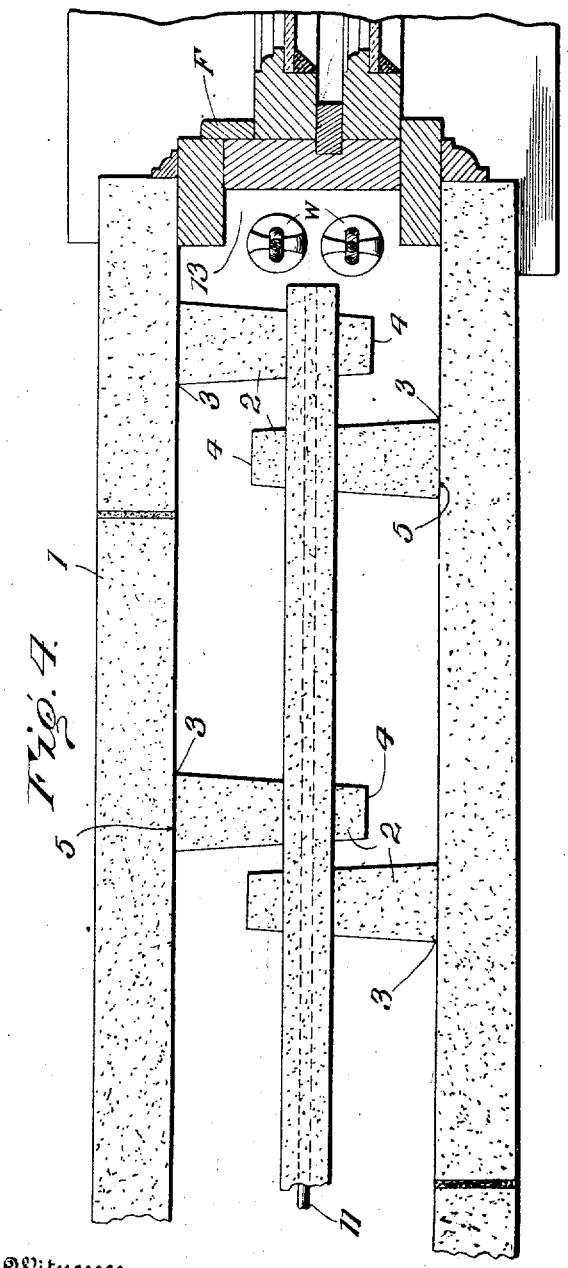
Figure 6:
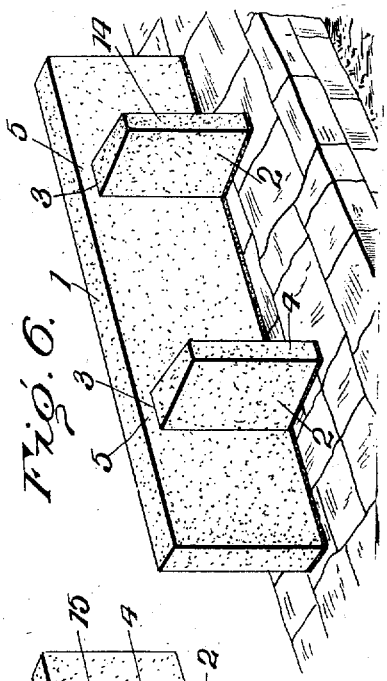
Figure 7:
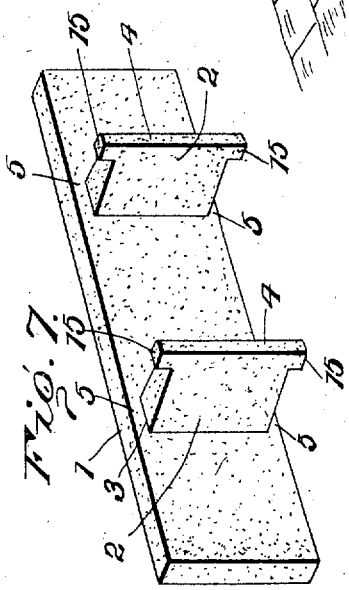

Figure 1 is a perspective detail of one of my improved blocks in one of its preferred forms and proportions. Fig. 2 is an inside elevation of the outer thickness of a wall built up of my improved blocks, the inner thickness thereof being omitted, but the position of the supporting lugs of the blocks in their inner thickness being indicated by dot and dash lines. Fig. 3 is an end elevation showing such a wall built up. Fig. 4 is a horizontal section through such a wall indicating the manner in which it is constructed adjacent a door or window frame. Fig. 5 is a vertical section showing a slight modification of the idea, as will be explained later. Fig. 6 is a perspective detail of one of the blocks as constructed when it is intended to be used in the lowermost course or row of a wall. Fig. 7 is a perspective detail of one of the blocks of which the wall shown in Fig. 5 is composed.

While it is my intention that the blocks composing the wall described below shall be made of plastic material, such as concrete, I do not wish to limit myself in this respect. The reinforcing members hereafter described are also by preference reinforced concrete bars, although here again I desire not to be limited in this particular.

The gist of the present invention lies in the construction of elements which go to make up the wall and in the manner in which they are arranged with relation to each other to effect the functions and advantages set forth in the following specification.

Referring now to the drawings, by reference numeral 1 designates the body of each block which by preference measures twenty-four inches by eight inches, and will be about one and three-fourths inches in thickness, and the numeral 2 designates two supporting lugs cast or formed on each block and projecting at right angles from one flat face thereof, as seen, the lugs being about ten inches from each other and set about seven inches from each end of the block, as shown. All these measurements are susceptible of change but I give them as my preferable dimensions because they work out successfully in a wall structure and are utilized in the illustration herewith. In length the lugs may be about the proportion shown and in shape they are rectangular in cross-section and by preference thicker at the intersection of the lugs with the face of the body 1 and thinner at the outer extremity 4. By preference they are of the same height throughout their length so as to provide a smooth flat upper edge-face and a smooth flat lower edge-face. The vertical dimension of each lug is less than the vertical dimension of the body 1 so that the body 1 projects above and below the lugs to thereby provide shoulders 5 above and below the neck 3 of each lug. I may here say that the construction shown in Fig. 6 is a special type or form of the block wherein the lower edge-faces of the lugs are flush with the lower edge-face of the block so that the lower shoulder 5 is omitted and the lug has a greater vertical dimension than the lugs shown in Fig. 1. Blocks of this kind are for the lowest row or tier of the wall and are intended to rest upon the foundation where it is desirable that not only the lower edge of the body shall rest thereon but also the lower edge-faces of its lugs, so that the lowermost course of blocks shall be firmly supported upon the foundation. By preference the supporting lugs 2 are about four and one-half inches in length, although it is quite possible to cast the block in sizes or perhaps all of one size and the lugs of different length, according as the builder may desire. However let us assume that the standard length is about that shown in the drawings, which is sufficient for purposes of illustration and description. There being an outer thickness and an inner thickness of each wall the third element thereof consists of a reinforced bar 10 preferably of concrete shown in Fig. 3 as of square cross-section with a metal rod 11 throughout its length, although the exact details of construction are unimportant in the present instance. It is essential, however, that the upright dimension of this reinforced bar shall be twice as great as the upright dimension of each shoulder 5, or in other words that it shall fill the space between the lower edges of one tier of lugs 2 and the upper edges of the tier beneath, as shown in Figs. 2 and 3.

In constructing a wall which is built of my improved blocks the latter are laid like bricks and in rows or courses with their ends 1′ in break-joint relation, as the peculiar disposition of the supporting lugs will permit, and by preference the rows in the opposite thickness are similarly disposed except that their ends 11 are opposite the centers of the blocks in the thickness first mentioned. This causes the opposing lugs of the blocks of a row in the inner thickness to interlap with the supporting lugs of the blocks of a like row in the outer thickness, the former lugs projecting outward and the latter lugs projecting inward; and if the wall is to be rather thin the extremities 4 of the various supporting lugs may contact with the inner faces of the bodies of the blocks in the opposite thickness. If, however, the wall is to be thicker, the bodies of the blocks of opposite rows are to be set farther apart so that the extremities of the lugs in one row will not make contact with the inner faces of the blocks in the opposite row. If the wall is to be extremely thick the extremities of the various supporting lugs may barely overlap each other, or it may be necessary to utilize blocks which are specially cast with supporting lugs of extreme length. I consider it desirable in any case that the supporting lugs do lap each other as best shown in Fig. 3. After the blocks in two opposite rows or courses have been laid the reinforcing element 10 is put in place, as illustrated in Figs. 2 and 3, resting upon the upper edges of the alternately disposed lugs and standing about midway between the inner faces of the two rows or thicknesses of the blocks. Thereafter the next course of the blocks are laid in the manner above described with respect to the disposition of their joints or ends, and the lower edges of their supporting lugs in turn rest upon the reinforcing element 10 just laid; and finally another element 10 is laid upon their upper edges, as illustrated in Fig. 3. This is continued for the full height of the wall and when the wall is completed a filling may be disposed therein if desired, or this filling may be inserted as the wall is being built. However, I have not illustrated this feature as it is well known in the art of wall construction.

Fig. 4 is illustrative of the use of my improved block when the wall is built up against the side of the frame F of a window or door. Of necessity, with the blocks breaking joint as above described, in each row the block of one thickness must be broken off so that a half length block may be employed; but the disposition of the lugs 2 should be the same as above described, although it is not absolutely necessary that those on the half length blocks shall be spaced from the others the same distance that the lugs on the full length blocks throughout the wall are spaced. This view shows how the reinforcing element may be cut off at 12 so as to leave a space 13 just outside of the frame F for the window weight W if desired; but of course if plastic material is afterward poured into the hollow wall provision must be made whereby it will not be permitted to fill this space. I will not amplify this description of building a corner or an angle as I do not consider it necessary to a full understanding of my invention and moreover it is well known in the art.

Referring now to Figs. 5 and 7, which illustrate a slight modification or elaboration of the idea above described, the numerals 15 designate shoulders preferably cast integral with the outer ends of the lugs 2, those on the upper edges of the lugs extending upward and those on the inner lugs depending from the bodies of the lugs to such an extent that the vertical dimension of each lug at its outer end will be the same as the vertical dimension of the body 1 of the block from which the lug projects. Obviously when blocks of this type are employed in building a wall in the manner above described, the upper and lower faces of the shoulders 15 of the adjacent vertical blocks come together as illustrated in Fig. 5 and form what may be called "hooks" engaging over the reinforcing element 10, as therein shown. I have purposely illustrated a square reinforce of such cross-sectional area that considerable space is left on either side of it, but it is clear that the reinforcing element might be given a greater lateral dimension or the shoulders might be made wider so that these elements will come in contact. This modification of my invention is employed where the wall is extremely high between the floor lines, where a plastic filling is to be poured in last, where the building is intended to carry machinery or otherwise be subject to vibration or in any case where great strength is desired. The obvious purpose of the "hooks" or shoulders 15 is to prevent the spreading of the two thicknesses of which the wall is composed and as each block in each row is hooked to a common longitudinal member 10 as it is laid, the spreading tendency of the block in one row will be resisted by that of the blocks in the opposite row and the wall will be greatly strengthened. However, the construction is such, that if it be desired to build a wall somewhat thinner than that shown in Fig. 5 the blocks in the two thicknesses may be pushed closer together than there illustrated and a wider reinforcing element 10 inserted as suggested above and with its upright sides in direct contact with the inner faces of the shoulders 15 of the two sets of lugs. Or if the hollow space between the two thicknesses is to be filled the square reinforce 10 shown in Fig. 5 might be employed and when the plastic filler is poured in it will set in the spaces between the hooks 15 and the reinforce 10 so that the walls subsequently will not spread. This idea also need not be further amplified. A structure might be erected having the two thicknesses of its walls thus "bonded" or tied together for the lowermost story or stories and in those above, omitting the shoulders 15, especially since the upper walls are usually not so thick and heavy. However all these details may be left to the builder, and the manufacturer will employ his judgment as the demands of the trade may indicate.

Particular attention is called to the fact that by reason of the upper and lower edge faces of the lugs 2, being disposed respectively, below and above the upper and lower edge-faces of the body 1 of the block and because the upper and lower edge face of the lugs are horizontally disposed and, in the preferable form of my construction, entirely unobstructed by shoulders or notches, it is possible to increase or decrease the thicknesses of a wall formed to suit any desired circumstance of building without changing the dimension of the block forming the wall. This is because the reinforcing element 10 in the preferred construction of my invention does not interlock with the lugs at any special point and does not limit therefore the amount of overlap between the lugs of the inner thickness of the wall and the lugs of the outer thickness of the wall. If the reinforcing element 10 has a thickness equal to twice the height of the shoulders 5 it will firmly support the lugs of one course upon the lugs of the subjacent course and the bodies of the blocks will be held in vertical position. It is further to be noted that by disposing the blocks of one thickness in spaced relation to the blocks of the opposite thickness of the wall, free circulation of air is permitted between the two thicknesses of the wall thus making a structure formed from my blocks thoroughly dry.

I do not wish to limit myself to the precise structure hereinbefore set forth, as it will be seen of course that the sizes, proportions and materials are unimportant.

Having thus described the invention what is claimed as new is:—

1. A building block comprising a body portion adapted to be set vertically and having a plurality of supporting lugs projecting from one of its faces whereby to permit the lugs to overlap similar lugs upon an opposite course of blocks, the height of the body being greater than that of the lugs so that the body shall project above and below the upper and lower faces of the lugs, said upper and lower faces of the lugs lying in horizontal planes at right angles to the face of the body portion whereby to support a reinforcing rod and permit the adjustment of the blocks of opposite courses toward or from each other.

2. A building block comprising a body portion adapted to be vertically disposed and having a plurality of lugs projecting from one of its faces and disposed in spaced relation to each other and to the ends of the body whereby to permit the lugs to overlap like lugs upon an opposite course of blocks, the height of said lugs being less than the height of the body so that the body will form shoulders projecting above and below the upper and lower edge-faces of the lugs, said upper and lower faces of the lugs lying in horizontal planes at substantially right angles to the plane of said body whereby to support a reinforcing rod and to permit the adjustment of the blocks of opposite courses toward or from each other.

3. A wall composed of outer and inner thicknesses, each thickness in turn composed of horizontal courses of building blocks, each block having a plurality of inwardly extending supporting lugs disposed in spaced relation to each other and to the ends of the block, the height of said lugs being less than the height of the body so as to leave shoulders projecting above and below the upper and lower faces of the lugs, said upper and lower faces of the lugs lying in horizontal planes, the lugs of the blocks of one thickness of the wall having staggered relation to the lugs of the block of the other thickness of the wall and overlapping the same, and a reinforcing bar resting upon the lugs of the lower course of blocks and supporting the lugs of the upper course, said bar having a thickness twice that of the said shoulders.

4. A wall composed of outer and inner thicknesses, each thickness consisting of horizontal courses of building blocks, the blocks of one course being laid in horizontal alinement with the block of the opposite course but in staggered relation thereto, each block comprising a body having a plurality of inwardly extending lugs disposed in spaced relation to each other and to the ends of the block, the height of said lugs being less than the height of the body so as to leave shoulders upon the body projecting above and below the upper and lower faces of the lugs, said upper and lower faces lying in horizontal planes, the lugs of the blocks in one thickness of a course overlapping the lugs of the opposite blocks, and reinforcing bars resting upon the lugs of the lower course of blocks and supporting the lugs of the upper course, said bars having a thickness twice that of said shoulders.

5. The herein described building block composed substantially of a right angular body having greater height than thickness and a plurality of lugs projecting integrally from one of its faces and also having greater height than thickness, the height of the lugs being less than that of the body so as to leave shoulders in the face of the latter above and below the lugs for the purpose set forth, and shoulders formed in the outer end of each lug, respectively, rising from its upper edge and depending from its lower edge a distance equal to the upright dimension of said shoulders so that the outer end of the lug shall have an upright dimension equal to that of the body, all as and for the purpose set forth.

6. In a reinforced wall structure, the combination with two separated thicknesses of blocks laid in opposite rows, each block consisting of a flattened right angular body extending on edge, a series of integral upright lugs projecting from said body toward the blocks in the opposite row and overlapping the lugs thereof, all of the lugs being also flattened, tapered laterally and of less upright dimension than said bodies so as to leave shoulders on the latter above and below the lugs, and shoulders projecting both upward and downward from the lugs at their outer thinner ends and having the same upright dimensions as the shoulders formed between the body of the block; and for each pair of rows of blocks a reinforced concrete bar of rectangular cross-section disposed between their bodies, resting on the upper edges of their lugs and having an upright dimension twice that of said shoulders.

JOHN SCOTT BANKS. [L. S.]

Witnesses:
W. W. TERRY,
MARGUERITE E. HAYNOR.